United States Patent [19]

Kabanov et al.

[11] 4,004,723
[45] Jan. 25, 1977

[54] APPARATUS FOR REMOVAL OF GLASS SHEET FLASH

[76] Inventors: Nikolai Pavlovich Kabanov, Naberezhnaya Shevchenko, 3, korpus 3, kv. 50; Vitaly Sergeevich Schukin, Leninsky prospekt, 72, kv. 500, both of Moscow; Jury Alexeevich Knyazev, ulitsa Shkolnaya, 1, kv. 16, Bor Gorkovskoi oblasti; Sergei Fedorovich Makhalov, ulitsa Shkolnaya, 5, kv. 10, Bor Gorkovskoi oblasti; Mikhail Ivanovich Popov, ulitsa Shkolnaya, 5, kv. 15, Bor Gorkovskoi oblasti; Dmitry Nikolaevich Savonichev, ulitsa Shkolnaya, 4, kv. 8, Bor Gorkovskoi oblasti; Dmitry Nikolaevich Shepelev, ulitsa Mayakovskogo, 1, kv. 3, Bor Gorkovskoi oblasti; Vladimir Nikolaevich Suvorov, ulitsa Shkolnaya, 2, kv. 6, Bor Gorkovskoi oblasti; Vladimir Pavlovich Chalov, ulitsa Mira, 3, kv. 2, Bor Gorkovskoi oblasti, all of U.S.S.R.

[22] Filed: Feb. 5, 1975

[21] Appl. No.: 547,402

[52] U.S. Cl. .................. 225/103; 225/96.5
[51] Int. Cl.² .................................. C03B 33/02
[58] Field of Search ............ 225/2, 3, 4, 5, 93, 225/94, 96, 96.5, 97, 98, 99, 103, 104, 105, 100, 101

[56] References Cited

UNITED STATES PATENTS

| 1,620,014 | 3/1927 | Evans | 225/98 |
| 1,885,245 | 11/1932 | Fix | 225/101 |
| 2,252,362 | 8/1941 | Carus | 225/98 |
| 3,172,590 | 3/1965 | Hulak | 225/101 |
| 3,570,734 | 3/1971 | Allen et al. | 225/96.5 X |
| 3,592,370 | 7/1971 | Boardman | 225/96.5 X |
| 3,779,437 | 12/1973 | Yamanoto et al. | 225/3 X |
| 3,917,139 | 11/1975 | Kabanov et al. | 225/96.5 |

Primary Examiner—Frank T. Yost
Attorney, Agent, or Firm—Robert E. Burns; Emmanuel J. Lobato; Bruce L. Adams

[57] ABSTRACT

In the hitherto known apparatus removal of the flash, i.e. of the remaining portion of a glass sheet is effected by means of abutment rods which are vertically reciprocable and adapted to exert downward pressure upon the flash. A characteristic feature of the disclosed apparatus is that the abutments therein are so arranged and mounted on the frame that they are capable of complex motion i.e. of moving simultaneously downwardly and from the center of the support table toward the edges thereof. Owing to this characteristic feature of the abutments separation of the flash is effected mainly on account of its being pulled sidewise, which prevents formation of cracks and broken edges in the shape cut out from the sheet, which is sometimes the case when the flash is separated by the action of purely vertical loads.

6 Claims, 5 Drawing Figures

APPARATUS FOR REMOVAL OF GLASS SHEET FLASH

The present invention relates to the art of cutting out required shapes from glass sheets and, more particularly, it relates to apparatus for removal of the flash off a glass sheet after the shape has been cut therefrom.

The expression "flash removal operation" in the present disclosure is meant to describe the operation of separating the shape cut out from a glass sheet from the remaining part of the sheet. The operation of cutting out a shape from a glass sheet, as it is commonly known, involves making in the sheet either a scratch or score or a through-going crack along the outline defining the shape to be cut out.

In majority of the practical implementations of the technique of flash removal is performed manually on tables designed for the purpose. Prior to the removal operation, the portions of the sheet to be removed, i.e. the flash, has several cuts made therein radially, more often than not in the corner areas of the sheet, whereafter the portions of the flash are broken off manually.

There are relatively widely known apparatus for mechanized flash removal. As apparatus of this known kind likewise includes a table adapted to support thereon a glass sheet, to have the flash removed therefrom, the outline of the perimeter of the work-supporting surface of this table accurately repeating that of the shape that is to be cut out. The framework of the apparatus has gas burners arranged thereon just outwardly of the perimeter of the table, intended to heat up the portions of the sheet that are to be removed. Intense heating of these portions of the flash results in cracking of the latter and self-separation from the figure that has been cut out.

A drawback of these known apparatus is that they ensure separation of the flash only when there is a through-going crack in the sheet extending along the entire line of cutting out. Should at least some portions of the outline of the shape only a scratch left by the glass-cutting tool instead of the through-going crack, there would be no separation of the flash along the required outline at these portions.

More often than not in such cases breaking off of the flash is accompanied by a crack reaching into the shape that has been cut out. There being at present no completely dependable devices that would positively ensure formation of the through-going crack throughout the cutting-out line, it is evident that the operation of flash removal with the help of the abovedescribed known apparatus involves a considerable amount of waste and rejects.

There are also relatively widely known apparatus for mechanical separation of the flash which are somewhat similar to the kind described hereinabove but the glass-cutting mechanisms instead of the burners, adapted to make radial cuts in the flash to be removed. Besides, the framework of these last-described apparatus has mounted thereon a vertically reciprocable frame carrying downwardly facing abutments arranged so that they overlie the marginal areas of the sheet. The abutments project to a varying extent increasing from one abutment to the next one.

The flash is broken off gradually, as the frame is lowered onto the sheet, with the abutments acting in succession upon the margins of the glass sheet.

A disadvantage of the apparatus of the last-described kind is that in the process of flash removal in some cases fragments are broken off the lower edge of the shape that has been cut out, particularly, at the curvilinear portions of the outline of the shape.

It is, therefore, the main object of the present invention to create an apparatus for mechanized flash removal, which should enable separation of flash from a shape that has been cut out either with a through crack running the entire length of the cutting-out line without such a crack, with no fragments broken off the cut-out shape and no cracks reaching into the confines of this shape.

It is, consequently, an object of the present invention to reduce the amount of waste resulting from the flash removal operation.

It is a practical object of the present invention to have a flash removal apparatus with improved abutment means directly involved in separation of the flash. A more particular object is to improve the suspension of the abutments and the shape thereof.

Other objects and advantages of the present invention will become apparent from the disclosure to follow.

These objects are attained in an apparatus for removal of a glass sheet flash, comprising a table adapted to accommodate thereon a glass sheet from which the flash is to be removed and abutments adapted to act upon the marginal areas of the said glass sheet during the glass removal operation, as they are driven toward the table, in which apparatus, in accordance with the invention, the abutments are mounted for motion in a direction from the centre of the table toward the periphery thereof.

Owing to this arrangement of the abutments, in the course of separation of the flash the latter is gripped between the top and bottom abutments and is broken off with the flash being slightly bent downwardly and, to a great extent, owing to the flash being pulled sidewise.

More particularly, the above specified motion is provided for by the abutments being suspended from horizontal arbors for free pivoting to one side of a vertical line.

In one embodiment of the invention the abutments are in the form of rollers mounted for free rotation about their respective axles.

With the abutments being in the form of rollers, it is expedient that the rollers should be made of an elastomeric material and be cup-shaped, the rollers being so mounted that their concave face should face away from the table.

In this case it is no longer necessary to have the rollers suspended for pivoting away from the vertical line, since the portion of the roller, engaging the glass, is deformable at the same time axially and radially, which provides for removal of the flash by the latter being pulled side wise with simultaneous slight downward bending.

To step up the effort with which the flash is pulled sidewise, it is expedient that the apparatus should include abutments adapted to act upon the marginal portions of the sheet, i.e. upon the flash from below, the abutments being similar to those acting upon the flash from above.

To attain the same purpose of stepping up the effort of pulling the flash sidewise, it is expedient that the abutments adapted to act upon the flash from below should be arranged directly under the abutments adapted to act upon the flash from above.

Given hereinbelow is a detailed description of embodiments of the present invention, with reference being had to the accompanying drawings, wherein.

Figure 1:
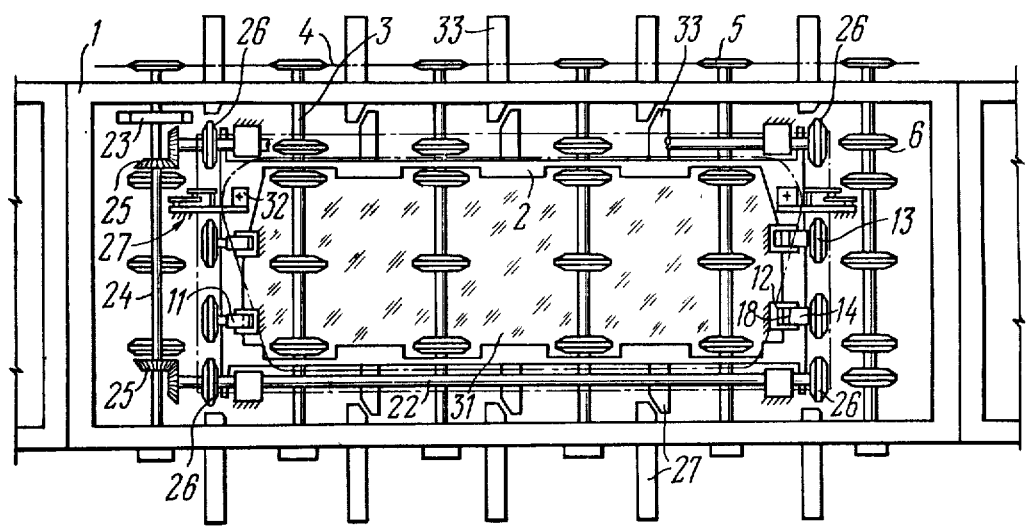
FIG. 1 is a plan view of the apparatus for removal of a flash.

Referring now in particular to the appended drawings, the apparatus comprises a framework 1 (FIGS. 1, 2, 4, 5) supporting thereon a vertically reciprocable table 2 adapted to accommodate thereon a glass sheet wherein a shape has been cut out and from which the flash is to be removed; the framework further having rotatably mounted thereon transverse shafts 3 rotatable from a driven chain 4 (FIG. 1) running over sprockets 5 secured on the respective shafts 3. The shafts have mounted thereon conveying rollers 6 (FIGS. 1, 2, 4 and 5) adapted to feed a glass sheet onto the table 2 and to remove the cut-out blank from the table 2 after it has been separated from the flash.

The table 2 is reciprocable between two definite positions:

the bottommost one of these two positions is the one whereat the table is below the sheet-supporting level of the conveying rollers 6 and the topmost one of these positions is the one whereat the table is above this level of the rollers 6. Reciprocation of the table 2 vertically between these two positions, i.e. from the bottommost position into the topmost one and vice versa is made possible by the table 2 being supported by wedge-type supports 7 (FIG. 2) upon which the table bears with caster wheels 8. The wedge-type supports 7, in their turn, are supported by a horizontally reciprocable platform 9. The table 2 is retained against longitudinal displacement by a rod 10 having one end thereof pivotally connected with the table 2 and the other end pivoted to the framework 1.

Horizontal reciprocation of the platform 9 is effected by an air cylinder 11 pivotally mounted between the framework 1 and the platform 9. With the platform 9 being reciprocated lengthwise, the table 2 is, respectively, lifted and lowered.

Figure 3:
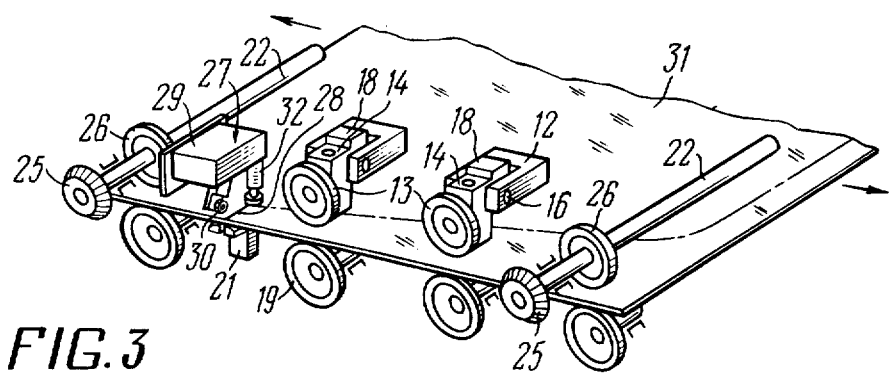
FIG. 3 is a perspective view illustrating the arrangement of the top and bottom flash removal abutments.
Figure 4:
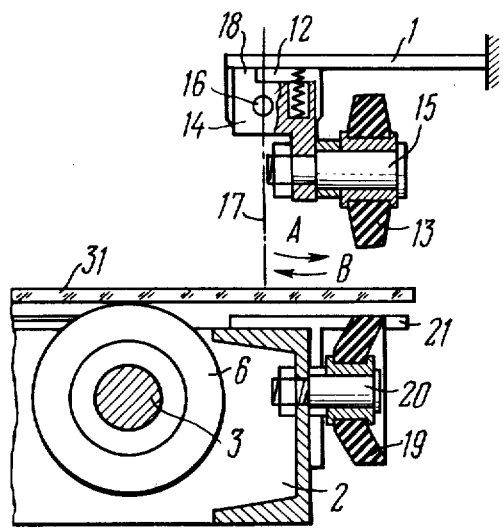
FIG. 4 shows in more detail the top and bottom roller mounting assembly, with the rollers being spread apart from their operating position.
Figure 5:
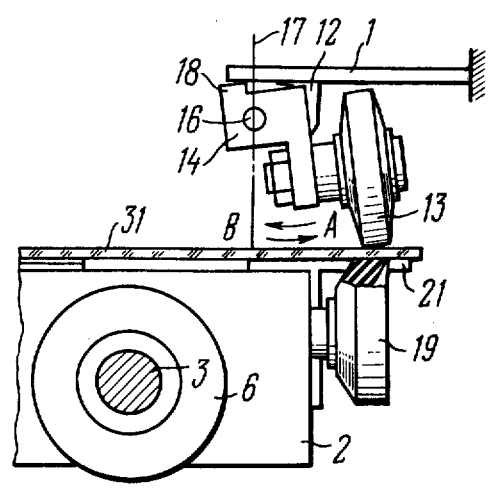
FIG. 5 shows the assembly illustrated in FIG. 4 in the flash removal position.

There are mounted on the framework 1 along the face ends of the table 2 brackets 12 (FIGS. 1, 3, and 4 and 5) supporting at the level of the work-supporting surface of the table 2 abutment means adapted to act upon the margins of a glass sheet from above, the abutment means being hereinafter referred to as top abutments. The top abutments which in the presently described exemplary embodiment are in the form of freely rotatable rollers 13 are mounted on L-shaped arms 14 (FIGS. 1, 2, 3, 4 and 5) for free rotation about their respective axles 15 (FIG. 4). In their turn, the L-shaped arms are suspended from respective horizontal pivot pins 16 (FIGS. 2, 3, 4 and 5) for free pivoting motion. However, the L-shaped arms 14 are pivotable on their respective pins 16 only to one side of a vertical line 17 (FIGS. 4 and 5) passing through the pin 16, in a direction from the centre of the table 2 toward the periphery thereof and back, which is illustrated in FIGS. 4 and 5 with the arrow lines "A" and "B", respectively. Pivoting of the L-shaped arms 14 to other side of the vertical line 17 is precluded by a projection or stop 18 (FIGS. 1, 2, 3, 4 and 5) of each arm 14 abutting against the framework 1.

The face ends of the table 2 have mounted thereon abutment means adapted to act upon the marginal areas of a glass sheet from below, to be referred to hereinbelow as the bottom abutments.

In the embodiment described these bottom abutments are in the form of cup shaped rollers 19 (FIGS. 2 to 5) made of an elastomeric or resilient material. The rollers 19 are mounted so that their concave faces are facing away from the table 2. The rollers 19 are freely rotatable about respective axles 20 (FIG. 4) secured in the respective face ends of the table 2.

The top abutments — the rollers 13 and the bottom abutments — the rollers 19 are arranged directly one above the other in vertical pairs, in which way the effort of pulling the flash portions off the cut-out shape is increased.

Figure 2:
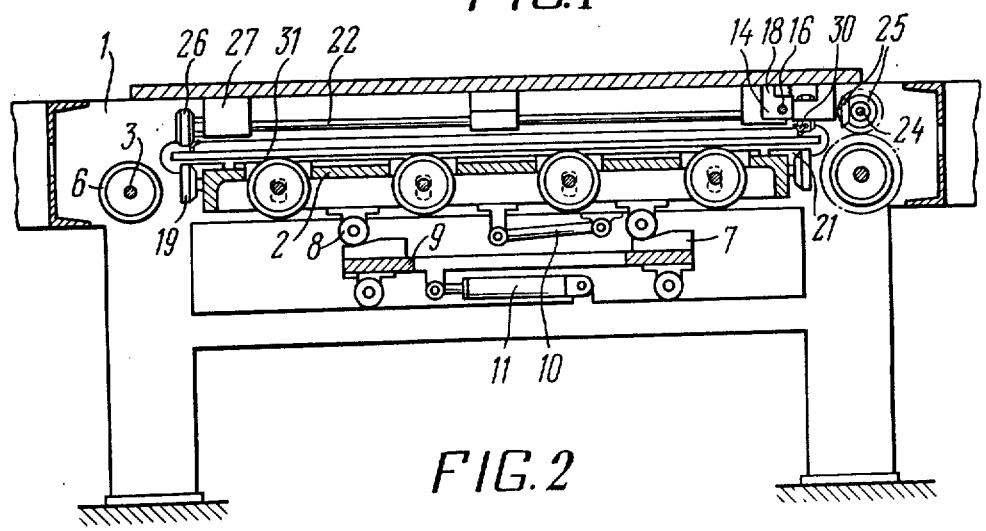
FIG. 2 is a cross-sectional elevation of the apparatus shown in FIG. 1.

There are also mounted on the face ends of the table 2 at the same level with the glass sheet-supporting surface thereof brackets 21 (FIGS. 2 to 5) serving as supports of the margins of the glass sheet, which are to be removed. Furthermore, there are mounted above the table 2 framework-supported shafts 22 (FIGS. 1 to 3) extending longitudinally of the table 2 and of the apparatus, as a whole. The two shafts 22 are rotated in opposite directions and have rotation transmitted thereto from one of the shafts 3 through gears 23 (FIG. 1), a shaft 24 (FIGS. 1 and 2) overlying this shaft 3 and bevel gear couples 25 (FIGS. 1 to 3). The shafts 22 have fixedly secured thereon rollers 26 adapted to move aside the respective portions of the flash separated by the rollers 13 and 19.

Furthermore, there are mounted on the framework 1 above the table 2 and directly above the brackets 12 cutting mechanisms 27 (FIGS. 1 to 3) for making cuts 28 (FIG. 3) in the flash part of a glass sheet.

Each cutting mechanism 27 includes a drive 29 mounted on the framework 1 of the apparatus and a cutting tool 30 (FIGS. 2 and 3) actuated by this drive longitudinally of a glass sheet 31 (FIGS. 1 to 5) through a displacement defined by the predetermined length of the cut.

The housing of the drive 29 carries a depnding abutment 32 (FIGS. 1 to 3) retaining the shape cut out in the glass sheet 31 against the table 2 in the course of separation and removal of the flash.

The hereinabove described apparatus represents, in our opinion, a preferred embodiment of the present invention, although by far not the only possible one.

Thus, it is not imperative that the abutment means should be in the form of the abovedescribed rollers 13 and 19, since these abutment means may be in the form of fingers, either elastic or rigid, capable of pivoting in a manner similar to the pivoting of the rollers 19. Moreover, it is not altogether imperative that the apparatus should incorporate cutting mechanisms 27, because the cuts 28 can be made in advance in the sheet by other devices, e.g. during the operation of cutting out the required shape.

The herein disclosed apparatus effects flash removal, as follows.

The table 2 is brought into its bottommost position, the drive of the shafts 3 is energized, and the conveying rollers 6 feed a glass sheet 31 with the required shape cut out therein to overlie the table 2. Then the air cylinder 11 is operated to raise the table 2 into the topmost position thereof, the cylinder 11 moving the platform 9 in a direction corresponding to the caster wheels 8 rolling up the slope of the wedge-type supports 7.

As the table 2 is being thus raised, the glass sheet 31 is lifted thereby off the rollers 6 and becomes supported by the table 2, the margins of the sheet 31 lying on the rollers 19 and brackets 21.

As the table 2 is raised higher, the glass sheet 31 is brought into engagement with the cutting tool 30 and the depending abutment 32 (the operation of feeding a glass sheet upon the table 2 is effected so that the narrowest portion of the flash underlies the cutting mechanism 27). Then the drive 29 of the cutting mechanism 27 is energized, whereby a cut 28 is made in the surface of the flash, whereafter the cutting tool 30 is driven clear of the margin of the glass sheet 31. Now the table 2 is finally driven by the same air cylinder 11 into the topmost position thereof whereat the sheet is thrust against the rollers 13, whereby the latter are deflected (in the present described embodiment pivoted) in a direction from the centre of the table and, consequently, that of the sheet 31 toward the sides thereof. At the same time the cup-shaped rollers 19 are deformed by the action thereupon of the glass sheet 31 so that the area of the roller 19 adjoining the glass sheet 31 is flattened and deflected in the same direction in which the overlying roller 13 is deflected.

Owing to this deflection and displacement of the rollers 13 and 19 the flash is broken along the cuts 28, the face end poritions of the flash being simultaneously pulled sidewise.

As the table 2 reaches its topmost position, the sheet 31 becomes pressed against the rollers 26. Owing to the rotation of these rollers the broken off portions of the flash are withdrawn along guides 33 (FIG. 1) in a transverse direction beyond the sides of the apparatus. Then the air cylinder 11 is operated in the reverse direction, whereby the table 2 is driven through a downward return stroke, the wheels 8 rolling down the slopes of the wedge-type supports 7.

The cut-out shape is now supported by the conveying rollers 6 which deliver it for further handling and treatment. The operating cycle of removal of the flash from one glass sheet is now completed.

What we claim is:

1. In an apparatus for removing flash from a marginal edge of a glass sheet scored to define a shaped portion to be cut from the glass sheet and of the type having means for supporting a major portion of the glass sheet; and means for applying a force to the flash along the marginal edge of the glass sheet to separate the flash portion from the shaped portion to be cut from the sheet; the improvement which comprises: said means for supporting a major portion of the glass sheet including a portion partially underlying the flash portion of the glass sheet; and said means for applying a force comprising the portion of said means for supporting which underlies the flash portion of the glass sheet, at least one resilient roller engagable with the portion of the flash portion which overlies said means for supporting to bear against the flash portion, and means mounting said at least one resilient roller to freely rotate about an axis of rotation and to pivot about an axis generally perpendicular to its axis of rotation and outwardly of the glass sheet while bearing against the flash portion thereby to apply a force effective to separate the flash portion outwardly from the glass sheet; and further comprising means operable for relatively displacing said means for supporting and said at least one resilient roller to bring said at least one resilient roller into engagement with the flash portion to effect separation of the same from the shaped portion to be cut from the glass sheet and for displacing said at least one resilient roller to disengage from the flash portion after separation of the flash has been effected.

2. An apparatus, for removing flash from a marginal edge of a glass sheet, comprising: a frame; a table for supporting the glass sheet and mounted on said frame; abutment means mounted on said frame and defining abutments for bearing against the flash portion of the glass sheet and for developing a force applied to the flash portion when the flash portion bears thereagainst; and mounting means for mounting said table and said abutment means on said frame, said mounting means comprising means operable for relatively displacing said table and said abutment means between a spaced condition and an adjacent condition with said abutments bearing against the flash portion to impart a force thereto sufficiently strong to separate the flash from the glass sheet wherein said abutment means comprises at least one resilient roller, and wherein said mounting means includes means mounting said resilient roller on said frame to rotate freely about an axis of rotation and to pivot about an axis generally perpendicular to its axis of rotation and outwardly of the glass sheet when the flash portion of the glass sheet bears thereagainst, whereby the force applied by said at least one resilient member to the flash portion acts in a direction to effect separation of the same from the glass sheet.

3. In an apparatus for removing flash from a marginal edge of a glass sheet scored to define a shaped portion to be cut from the glass sheet and of the type having means for supporting a major portion of the glass sheet; and means for applying a force to the flash along the marginal edge of the glass sheet to separate the flash portion from the shaped portion to be cut from the sheet; the improvement which comprises: said means for supporting a major portion of the glass sheet including a portion partially underlying the flash portion of the glass sheet; and said means for applying a force comprising the portion of said means for supporting which underlies the flash portion of the glass sheet, a resilient member engagable with the portion of the flash portion which overlies said means for supporting to bear against the flash portion, and means mounting said resilient member to pivot outwardly of the glass sheet while bearing against the flash portion thereby to apply a force effective to separate the flash portion outwardly from the glass sheet, wherein the portion of said means for supporting which underlies the flash portion includes resilient cup-shaped rollers disposed for gripping the flash portion in cooperation with said resilient member when said means for supporting is displaced to bring the flash portion into engagement with said resilient member; and further comprising means operable for relatively displacing said means for supporting and said resilient member to bring said resilient member into engagement with the flash portion to effect separation of the same from the shaped portion to be cut from the glass sheet and for displacing said resilient roller to disengage the flash portion after separation has been effected.

4. In an apparatus according to claim 3, wherein said resilient member is mounted directly opposite said cup-shaped rollers.

5. An apparatus, for removing flash from a marginal edge of a glass sheet, comprising: a frame; a table for supporting the glass sheet and mounted on said frame; abutment means mounted on said frame and defining abutments for bearing against the flash portion of the glass sheet and for developing a force applied to the flash portion when the flash portion bears thereagainst; mounting means for mounting said table and said abutment means on said frame, said mounting means comprising means operable for relatively displacing said table and said abutment means between a spaced condition and an adjacent condition with said abutments bearing against the flash portion to impart a force thereto sufficiently strong to separate the flash from the glass sheet in a direction away from the glass sheet; and cup-shaped rollers, mounted on said table opposite said abutments and with their concave surfaces away from said table, for gripping the flash portion in cooperation with said abutments and to jointly apply a force to the flash portion when said table is positioned in said adjacent condition.

6. In an apparatus for removing flash from a marginal edge of a glass sheet scored to define a shaped portion to be cut from the glass sheet and of the type having means for supporting a major portion of the glass sheet; and means for applying a force to the flash along the marginal edge of the glass sheet to separate the flash portion from the shaped portion to be cut from the sheet; the improvement which comprises: said means for supporting a major portion of the glass sheet including a portion partially underlying the flash portion of the glass sheet; and said means for applying a force comprising the portion of said means for supporting which underlies the flash portion of the glass sheet, at least one resilient member engagable with the portion of the flash portion which overlies said means for supporting to bear against the flash portion with the flash portion gripped between said at least one resilient member and the portion of said means for supporting which underlies the flash, and means mounting only said at least one resilient member to pivot outwardly of the glass sheet while bearing against the flash portion thereby to apply a force effective to separate the flash portion outwardly from the glass sheet with the portion of said means for supporting which underlies the flash remaining stationery during separation of the flash; and further comprising means operable for relatively displacing said means for supporting and said at least one resilient member to bring said at least one resilient member into engagement with the flash portion to effect separation of the same from the shaped portion to be cut from the glass sheet and for displacing said at least on resilient member to disengage from the flash portion after separation of the flash has been effected.

* * * * *